Figure 1:
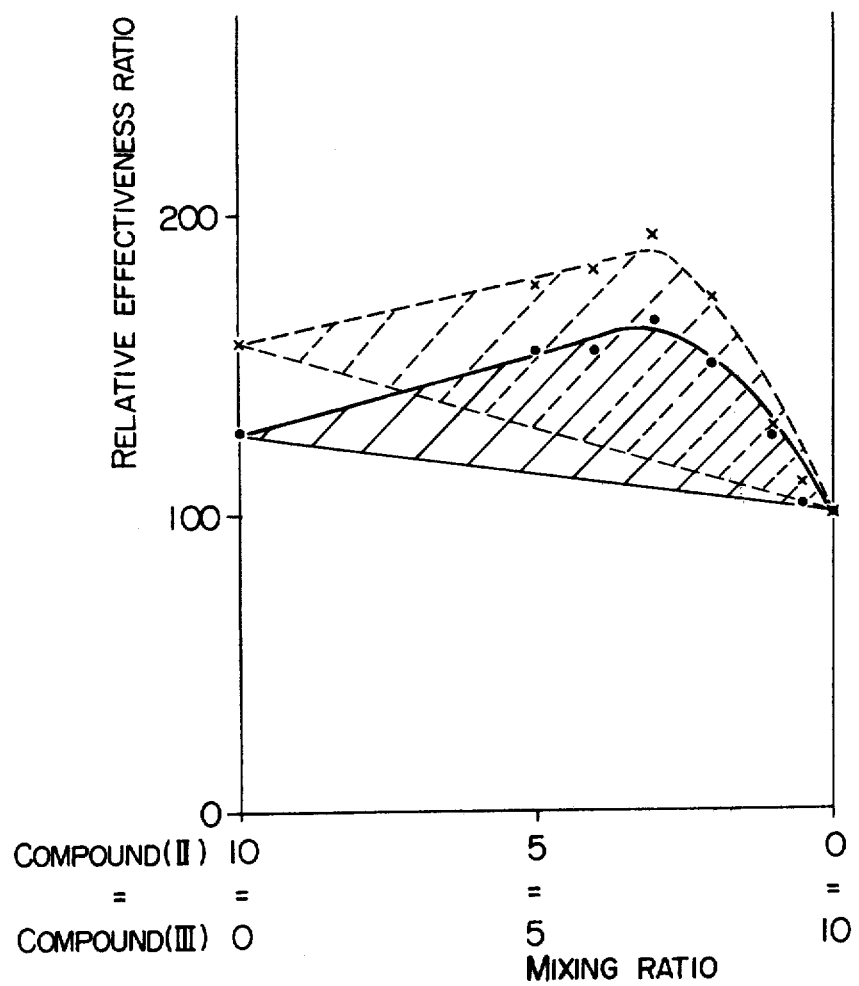

United States Patent [19]

Okuno et al.

[11] 3,906,089

[45] Sept. 16, 1975

[54] SYNERGISTIC CHRYSANTHEMATE INSECTICIDES

[75] Inventors: Yoshitoshi Okuno, Toyonaka; Akira Toyoura; Akio Higo, both of Nishinomiya, all of Japan

[73] Assignee: Sumitomo Chemical Company, Limited, Osaka, Japan

[22] Filed: Oct. 15, 1974

[21] Appl. No.: 514,776

[30] Foreign Application Priority Data
Oct. 15, 1973    Japan.............................. 48-116231

[52] U.S. Cl. ..................... 424/45; 424/40; 424/274; 424/306
[51] Int. Cl. .......................... A01n 9/22; A01n 9/24
[58] Field of Search ...................... 424/274, 306, 45

[56] References Cited
UNITED STATES PATENTS
3,268,551    8/1966    Kukamoto et al. ............. 424/306 X
3,723,615    3/1973    Okuno ........................... 424/306 X

*Primary Examiner*—Albert T. Meyers
*Assistant Examiner*—Leonard Schenkman
*Attorney, Agent, or Firm*—Stevens, Davis, Miller & Mosher

[57] ABSTRACT

An insecticidal composition containing an inert carrier and as active ingredients an insecticidally effective amount of a mixture consisting of (±)2-allyl-3-methyl-cyclopent-2-ene-1-one-4-yl (+)transchrysanthemate or (+)2-allyl-3-methyl-cyclopent-2-ene-1-one-4-yl (+)trans-chrysanthemate and N-(3,4,5,6-tetrahydrophthalimido)-methyl (±)cis, trans-chrysanthemate or N-(3,4,5,6-tetrahydrophthalimido)-methyl (+)-trans-chrysanthemate, which has low toxicity to mammals and excellent in both knock-down and killing effects, particularly in knock-down effect.

7 Claims, 2 Drawing Figures

FIG. I
RELATIVE EFFECTIVENESS RATIO ACCORDING TO MIXTURES OF COMPOUND (II) AND COMPOUND (III)

RELATIVE EFFECTIVENESS RATIO ACCORDING TO MIXTURES OF COMPOUND (II) AND COMPOUND (IV)
—•— NORTHERN HOUSE MOSQUITO ADULT
---×--- HOUSEFLY ADULT

SYNERGISTIC CHRYSANTHEMATE INSECTICIDES

This invention relates to an insecticidal composition prepared by mixing two kinds of known chrysanthemate type insecticides, thereby overcoming the drawbacks of the individual insecticides and making it possible to increase the insecticidal effects thereof. More particularly, the present invention pertains to an insecticidal composition having prominently rapid knockdown effect (hereinafter abbreviated to "K.D.") and killing effect, the said composition being prepared by mixing ($\pm$)2-allyl-3-methyl-cyclopent-2-ene-1one-4-yl (+)trans-chrysanthemate [hereinafter referred to as "the compound (I)"] or (+)2-allyl-3-methyl-cyclopent-2-ene-1-one-4-yl (+)transchrysanthemate [hereinafter referred to as "the compound (II)"], and N-(3,4,5,6-tetrahydrophthalimido)-methyl ($\pm$)cis,trans-chrysanthemate [hereinafter referred to as "the compound (III)"] or N-(3,4,5,6-tetrahydrophthalimido)-methyl (+)trans-chrysanthemate [hereinafter referred to as "the compound (IV)"], and inert carriers; and the mixing ratio of the compound (I) or (II) to the compound (III) or (IV) being within a range between 9.5 : 0.5 and 0.5 : 9.5 by weight; preferably the range being between 1 : 1 and 1 : 9, and more preferably the range being between 1 : 2 and 1 : 3.

The present insecticidal composition may comprise 0.05 to 90 % by weight of the above mentioned mixture as the active ingredient, and in case of an oil spray or an aerosol spray the practically used composition of the present invention contains 0.15 to 0.5 % by weight of the above mentioned mixture. The compound (I) or (II) are low toxic insecticides having a rapid K.D. effect on so-called sanitary injurious insects and on agricultural injurious insects. However, the compound (I) or (II) have such a drawback that when used singly, they have a prominent K.D. effect on mosquitos but on houseflies their K.D. effects are not so much strong in case of an aerosol spray. On the other hand, the compound (III) or (IV) have also a rapid K.D. effect on so-called sanitary injurious insects and on agricultural injurious insects, and are markedly low in toxicity to mammals. However, the compound (III) or (IV) have such a drawback that when used singly, they have prominent K.D. effect on houseflies but on mosquitoes their K.D. effects are not so much strong in case of an aerosol spray. Hence each of the compound (I), (II), (III) or (IV) is seemed to be insufficient as a domestic insecticide which is required to be extremely rapid in K.D. effect on both mosquitoes and houseflies, in practice.

As a result of extensive studies made for years on extremely strong insecticides which are low toxic and have a rapid K.D. effect, the present inventors have found that when the compound (I) or (II) are mixed with the compound (III) or (IV), the drawbacks of the individual compound are overcome and, surprisingly, the each mixture of said two components can display marked synergistic actions not only in K.D. effect on both mosquitoes and houseflies but also in killing effect on them which cannot be easily inferred from some other mixtures and which cannot be easily elucidated theoretically.

Present mixtures, therefore, can serve as a prominent insecticide for a domestic use which is required to rapidly knock-down and kill sanitary injurious insects by using a small amount of an insecticide. As the present mixtures show the strong K.D. effect and killing effect not only on sanitary injurious insects but also on agricultural injurious insects by using a small amount of the present mixtures, the bad effects on human beings and the pollution of environments are not caused. Therefore the present inventors supply the practically effective insecticidal composition.

The synergistic actions attained by mixing the compound (I) or (II) with the compound (III) or (IV) are explained in details below with reference to Test Examples.

TEST EXAMPLE 1

In order to investigate the synergistic action between the compound (II) and the compound (III) or (IV), the two components were formulated into their oil sprays (0.1 % by weight of oil preparation) as shown in the following Table 1 using a deodorized kerosene. 20 Adult mosquitoes (*culex pipiens*) or 20 adult houseflies (*Musca domestica*) were released in a (70cm)$^3$ volume glass box and sprayed with each of the oil preparations obtained above in an amount of 0.7 ml under a pressure of 1.5 Kg/cm$^2$, and then the number of knocked down adults were counted with lapse of time. The test was repeated 5 times and the values of KT$_{50}$ (a period required for 50 % knock-down) are as shown in Table 1.

Table 1

| 0.1% Oil Preparation | Mosquito adults KT$_{50}$ (sec) | Relative efficacy | Housefly adults KT$_{50}$ (sec) | Relative efficacy |
|---|---|---|---|---|
| Compound (III) alone | 123 | 100 | 129 | 100 |
| Compounds II + III | | | | |
| [5 : 5] | 80 | 154 | 73 | 177 |
| Compounds [4 : 6] | 80 | 154 | 71 | 182 |
| Compounds [3 : 7] | 75 | 164 | 67 | 193 |
| Compounds [2 : 8] | 82 | 150 | 75 | 172 |
| Compounds [1 : 9] | 98 | 126 | 100 | 129 |
| Compounds [0.5 : 9.5] | 120 | 103 | 117 | 110 |
| Compound (II) alone | 96 | 128 | 82 | 157 |
| Compounds II + IV | | | | |
| [5 : 5] | 48 | 256 | 56 | 230 |
| Compounds [4 : 6] | 46 | 267 | 51 | 253 |
| Compounds [3 : 7] | 45 | 273 | 48 | 269 |
| Compounds [2 : 8] | 47 | 262 | 52 | 248 |
| Compounds [1 : 9] | 52 | 237 | 60 | 215 |
| Compounds [0.5 : 9.5] | 56 | 220 | 63 | 205 |
| Compound (IV) alone | 61 | 202 | 66 | 195 |
| Pyrethrins | 127 | 97 | 135 | 96 |

Figure 2:
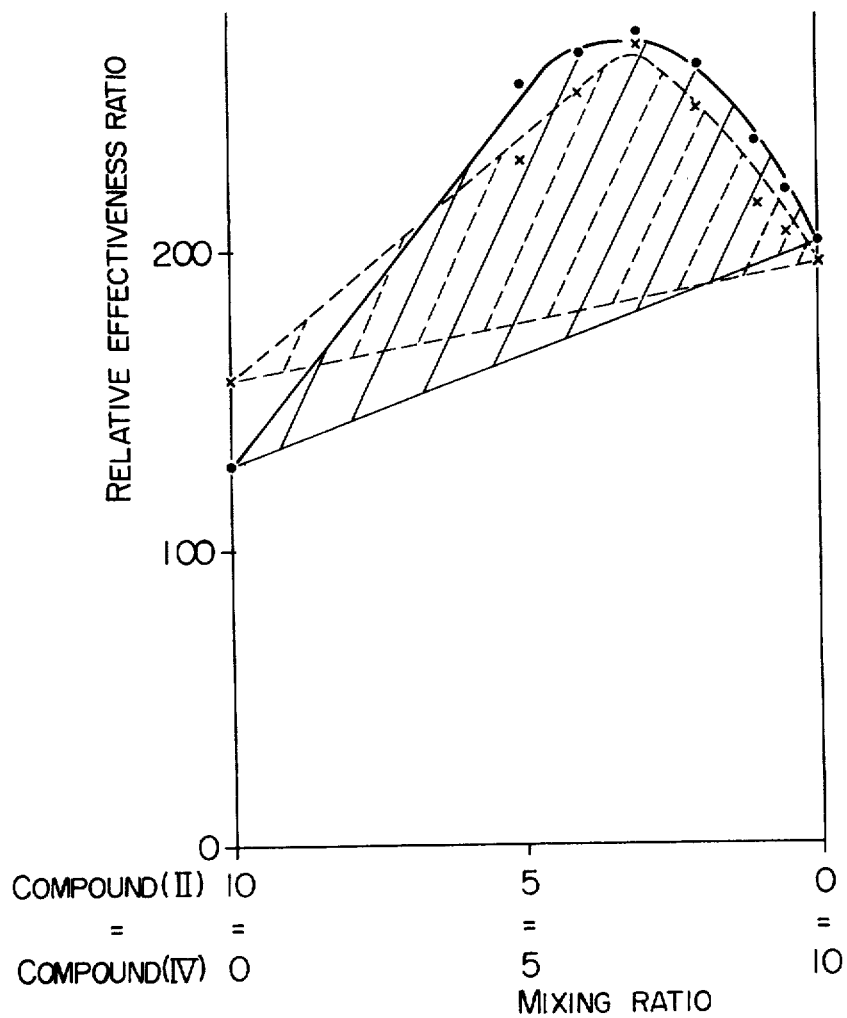

[Note] refer to FIG. 1 and FIG. 2

From the result of Table 1, FIG. 1 and FIG. 2, it is clear that the relative efficacy of the each present mixture is over the line drawn from the relative efficacy of the individual components constructing the said mixture, and, therefore, it is evident that the present mixtures show the effective synergistic effect. From the FIG. 1 and FIG. 2 it is evident that the most suitable mixing ratio of the compound (I) and the compound (II) or (III) is in the range between 4 : 6 and 2 : 8, respectively.

TEST EXAMPLE 2

In order to investigate the synergistic action between the compound (I) and the compound (IV), the two components were formulated into the liquid solution as shown in the following Table 2 using acetone. Then the killing effect of the mixture on German cockroach adults (*Blattella germanica*) was tested by the topical application method.

The values of $LD_{50}$ (50 % Lethal dose) are as shown in Table 2.

Table 2

| Test Compounds | $LD_{50}$ (γ/Roach) | Relative efficacy | Joint efficacy (by Sun*) |
|---|---|---|---|
| Compound (I) alone | 2.5 | 136 | — |
| Compound (I) + | | | |
| Compound (IV) [3 : 7] | 1.8 | 189 | 171 |
| Compound [2 : 8] | 1.7 | 200 | 189 |
| Compound [1 : 9] | 2.6 | 131 | 127 |
| Compound (IV) alone | 3.4 | 100 | — |

*The values of joint efficacy were calculated according to the Yun-Pei Sun's method. [Yun-Pei Sun et al. J.E.E. 53 p. 687 - 891 (1960)]

They said that if the mixture gives a joint efficacy greater than 100, it indicates a synergistic action.

TEST EXAMPLE 3

In order to investigate the synergestic action between the compound (I) or (II) and the compound (III) or (IV), the two components were formulated into aerosols shown in the following Table 3.

Then the insecticidal activity of the each aerosol on yellow fever mosquito adults (Aedes aegypti) and housefly adults (Musca domestica) were tested by the aerosol test method using a (6ft)³ Peet Grady's chamber [the method disclosed in "Soap and Chemical Specialities, Blue Book" (1965)]. The results are as shown in Table 3.

tric mosquito killer mats, thermal fog, other heating or non-heating fumigants and powdery or solid preparations incorporated with baits or materials attractive for injurious insects. Further, they can be easily prepared according to the ordinary procedures.

No matter what proportions are employed within a range of between 0.5 : 9.5 and 9.5 : 0.5, the present compositions display strong synergistic effects, but proportion to be adopted is dependent upon the purpose of application of the resulting composition.

In preparing the compositions according to the present invention, it is also possible to obtain an excellent insecticidal effect by employing a combination of the present mixture and such a known synergist effective for allethrin or pyrethrin as α-[2-(2-butoxyethoxy)ethoxy]-4,5-methylenedioxy-2-propyltoluene (referred to as piperonyl butoxide), 1,2-(methylenedioxy)-4-[2-(octylsulfinyl)propyl]benzene (referred to as sulfoxide), 4-(3,4-methylenedioxyphenyl)-5-methyl-1,3-dioxane (referred to as Safroxane), N-(2-ethylhexyl)-bicyclo[2.2.1]hept-5-en-2,3-dicarboximide (referred to as MGK-264), octachlorodipropylether (referred to as S-421), iso-bornylthiocyanoacetate (referred to as Thanite) and the like.

As the chrysanthemate type insecticide is generally unstable to lights, heats, oxidations or the like, it is also possible to obtain various compositions which have a more stable insecticidal activity by combining the present mixture with a suitable amount of an anti-oxidant or a U.V. absorber, for example, phenol derivatives Table 3

| Composition (Aerosol) | Mosquito adults | | | | | Housefly adults | | | | |
|---|---|---|---|---|---|---|---|---|---|---|
| | Concentration of active ingredient | Knock-down (%) | | | Mortality (%) | Concentration of active ingredient | Knock-down (%) | | | Mortality (%) |
| | | 5' | 10' | 15' | | | 5' | 10' | 15' | |
| Compound (I) + Compound (III) [5 : 5] | 0.2 % | 30 | 80 | 100 | 58 | 0.4 % | 24 | 47 | 82 | 36 |
| Compound (I) + Compound (IV) [5 : 5] | " | 42 | 90 | 100 | 65 | " | 36 | 60 | 94 | 46 |
| Compound (II) + Compound (III) [2 : 8] | " | 40 | 89 | 100 | 63 | " | 28 | 50 | 84 | 38 |
| Compound (II) + Compound (III) [2.5 : 7.5] | " | 43 | 89 | 100 | 63 | " | 30 | 52 | 90 | 40 |
| Compound (II) + Compound (IV) [2.5 : 7.5] | " | 51 | 94 | 100 | 69 | " | 40 | 68 | 98 | 50 |
| Compound (II) + Compound (III) [4 : 6] | " | 48 | 93 | 100 | 68 | " | 34 | 57 | 92 | 44 |
| Compound (I) alone | " | 27 | 78 | 95 | 40 | " | 12 | 38 | 75 | 21 |
| Compound (II) alone | " | 38 | 86 | 98 | 58 | " | 20 | 46 | 81 | 35 |
| Compound (III) alone | " | 18 | 53 | 76 | 32 | " | 16 | 44 | 80 | 22 |
| Compound (IV) alone | " | 32 | 75 | 92 | 61 | " | 32 | 55 | 90 | 42 |
| Pyrethrins | " | 20 | 57 | 80 | 35 | " | 18 | 42 | 78 | 25 |

A synergistic effect can clearly be observed from Table 3, considering that each mixed preparation has a higher insecticidal activity than the added activity of each insecticidal components constituting the preparation.

In the practically used aerosol preparation, such chemicals as piperonyl butoxide, a chrysanthemate type insecticide having the high killing effect (ex. 5-benzyl-3-furylmethyl chrysanthemate, 3-phenoxybenzyl chrysanthemate) or a low toxic organophosphorus insecticide may be mixed with the present mixture to enhance the killing effect thereof.

From the Test Examples 1, 2 and 3, the synergistic effects of the present mixtures are seen to be excellent.

The present mixture can be formulated, like other chrysanthemate type insecticides, into oil solutions, dusts, emulsifiable concentrates, aerosols, wettable powders, granules, fine granules, mosquito coils, elecsuch as BHT (butylated hydroxytoluene), BHA (butylated hydroxyanisole) and the like; bis-phenol derivatives; aryl amines such as phenyl-α-naphthylamine, phenyl-β-naphthylamine, a condensation compound of phenetidin with acetone and the like; benzophenone type compounds.

And further it is possible to obtain various compositions which are useful for a wide variety of applications by combining the present mixture with other pesticidal compounds, for example, organic chlorinated insecticides such as DDT, BHC, methoxychlor and the like; organic phosphorus insecticides such as O,O-dimethyl-O-(3-methyl-4-nitro)phenyl phosphorothioate [referred to as Sumithion (trade name of Sumitomo Chemical Company Limited)], O,O-dimethyl-O-(2,2-dichlorovinyl)-phosphate (referred to as DDVP), O,O-dimethyl-O-4-cyanophenyl phosphorothioate [referred to as Cyanox (trade mark of Sumitomo Chemical Company Limited)] and the like; carbamate type insecticides such as 1-naphthyl-N-methyl carbamate, 3,4-dimethylphenyl-N-methyl carbamate, 3,5-dimethylphenyl-N-methyl carbamate, 2-isopropoxyphenyl-N-methyl carbamate and the like; chrysanthemate type insecticides such as Chrysron (trade name of Sumitomo Chemical Company Limited), 3-phenoxybenzyl chrysanthemate, 5-propargylfurfuryl chrysanthemate and their geometrical or optical isomers and the like; or other pesticides such as other insecticides, fungicides, nematocides, acaricides, herbicides, fertilizers; microbial pesticides such as insecticidal composition including Bacillus thuringiensis, or Bacillus Moritai and the like; or insect hormone compounds.

The present insectical composition can be used to control not only sanitary injurious insects such as houseflies, mosquitoes, cockroaches and the like, but also insects injurious to agriculture, household horticulture and stored cereals such as grain mites, indian meal moth, rice weevil, planthoppers, leafhoppers, armyworms, diamond-back moth, leaf rollers, aphids, spider mites and silk moth, but also for the control of lice and ticks parasitic to animals, and many other injurious pests. Particularly, the insecticidal composition according to the present invention are low in toxicity and harmless to mammals, and hence are quite advantageous in that they are freeely applicable to crops before harvest and food-packaging materials and are safely usable for house horticulture and green house cultivation.

The preparation and activity of the compositions of the present invention will be illustrated with reference to the following preparation and examples, which are only given for the purpose of illustration, and not to be interpreted as limiting.

Preparation 1

To 0.15 part of each of the compounds (III) and (IV) was added 0.1 part of the compound (I) or to 0.15 part of each of the compounds (III) and (IV) was added 0.05 part of the compound (II). The mixtures were each dissolved in kerosene to 100 parts of total weight. Four oil sprays were thus obtained.

Preparation 2

To 0.08 part of each of the compounds (III) and (IV) were added 0.02 part of the compound (II) and 1.0 part of piperonyl butoxide. The mixtures were each dissolved in kerosene to 100 parts of total weight. Two oil sprays were thus obtained.

Preparation 3

To 6 parts of each of the compounds (III) and (IV) were added 4 parts of the compound (II), 5 parts of DDVP, 15 parts of Sorpol SM-200 (registered trade name for an emulsifier sold by Toho Kagaku Co., Ltd.) and 70 parts of xylene. The mixtures were each thoroughly mixed to make a solution. Two emulsifiable concentrates were thus obtained.

Preparation 4

To 13 parts of each of the compounds (III) and (IV) were added 7 parts of the compound (II), 5 parts of 3-phenoxybenzyl chrysanthemate, 5 parts of Sorpol SM-200 (the same as above) and 70 parts of 300 mesh talc. The mixtures were each thoroughly mixed by means of a mortar. Two wettable powders were thus obtained.

Preparation 5

To 1.4 parts of each of the compounds (III) and (IV) were added 0.6 part of the compound (II), 10 parts of Safroxane. The mixtures were each dissolved in 20 parts of acetone, and 88 parts of 300 mesh diatomaceous earth were added thereto. The resulting mixtures were each thoroughly mixed by means of a mortar, and then acetone was removed by evaporation. Two dusts were thus obtained.

Preparation 6

0.45 Gram of each of the compounds (III) and (IV), 0.15 g of the compound (II) and 0.2 g of BHT were dissolved in 20 ml. of methanol. The solution were each uniformly mixed with 99.2 g of a mosquito coil carrier containing Tabu powder, Pyrethrum marc and wood powder in a ratio of 3 : 5 : 1, and then methanol was evaporated. Each residue was given 150 g of water, kneaded thoroughly, shaped into a mosquito coil and dried. Two mosquito coils were thus obtained.

Preparation 7

0.06 Gram of each of the compounds (III) and (IV), 0.02 g of the compound (II), 0.02 g of 5-propargylfurufryl chrysanthemate, and 0.1 g of piperonyl butoxide were dissolved in a proper amount of chloroform. The solutions were each adsorbed uniformly to the surface of an asbestos piece of 3.5 cm × 1.5 cm in area and 0.3 mm in thickness, and then another piece of asbestos of the same size was sticked to the surface. Two fibrous heating fumigant insecticidal compositions for use on a heater were thus obtained. Pulp plate may be used in place of asbestos as a fibrous carrier having the same effect.

Preparation 8

0.15 Part of each of the compounds (III) and (IV), 0.1 part of the compound (I), 1.0 part of piperonyl butoxide and 0.1 part of each of Chrysron and 3-phenoxybenzyl chrysanthemate were dissolved in a mixture of 6.725 parts of xylene and 6.725 parts of deodorized kerosene. The each solutions was filled in an aerosol container. After attaching a valve portion to the container, 85 parts of propellent [e.g. liquified petroleum gas. Freon (registered trade name by Du Pont)] were charged therein under pressure through the valve. Each aerosol was thus obtained.

Preparation 9

To 0.15 part of each of the compounds (III) and (IV) were added 0.05 part of the compound (II), 1.0 part of piperonyl butoxide, and 0.1 part of each of Chrysron and 3-phenoxybenzyl chrysanthemate. Each mixture was dissolved in a mixture of 6.85 parts of xylene and 6.85 parts of deodorized kerosene. The solutions were treated in the same manner as described in Preparation 8 to give four aerosols.

Preparation 10

0.16 Part of each of the compounds (III) and (IV), 0.04 part of the compound (II), and 0.5 part of each of Sumithion and Cyanox were dissolved in a mixture of 7.15 parts of xylene and 7.15 parts of deodorized kerosene. The solutions were treated in the same manner as described in Preparation 8 to give four aerosol.

Preparation 11

0.12 Part of each of the compounds (III) and (IV), 0.08 part of the compound (II), 1.6 parts of piperonyl butoxide, 12.2 parts of deodorized kerosene and 1 part of an emulsifier Atmos 300 (registered trademark of Atlas Chemical Co.) were emulsified with 50 parts of pure water. The resulting emulsion was filled together with 35 parts of a 3 : 1 mixture of deodorized butane and deodorized propane into an aerosol container to obtain two water-based aerosol preparations.

Preparation 12

1.5 Parts of each of the compounds (III) and (IV), 0.5 part of the compound (II), 1 part of 2-isopropoxyphenyl-N-methylcarbamate, 5 parts of Toyolignin CT (registered trade name of Toyo Spinning Co., Ltd.) and 90 parts of GSM clay (registered trade name for clay sold by Zieklite Mining Co., Ltd.) were thoroughly mixed by means of a mortar.

Then, the mixture was well mixed with 10 % by its weight of water, granulated by means of a granulator and air-dried to give two granular preparations.

The insecticidal activity of the present compositions thus obtained was as follows.

Example 1

About 50 housefly adults (*Musca domestica*) were liberated in a (70 cm)$^3$ glass chamber. 0.7 Milliliter of each of the oil sprays formulated according to Preparation 1 was sprayed under a pressure of 1.5 kg/cm$^2$ through a glass atomizer. Then, more than 80 % of the adults were knocked down within 10 minutes.

EXAMPLE 2

5 Milliliters of each of the oil sprays formulated according to Preparations 1 and 2 were sprayed, using Campbel's turn table method (the same as above). About 100 house-fly adults (*Musca domestica*) per group were exposed to the descending mist for 10 minutes. By the next day, more than 80 % of the flies were killed with any oil spray.

Example 3

The emulsifiable concentrates formulated according to Preparation 3 were each diluted 200,000 times with water. 2 Liters of each test emulsion so prepared were taken in a styrene case of 23 cm × 30 cm in area and 6 cm in depth, and about 100 full grown larvae of Northern house mosquito (*Culex pipeus pulleus*) were liberated therein. By the next day, more than 90 % of the larvae were killed with any concentrate.

Example 4

Rice plants, elapsed 45 days after sowing, were grown in 1/50,000 Wagner pots and sprayed with 10 ml/pot of an aqueous 500 fold dilution of each of the emulsifiable concentrates obtained in Preparation 3. Subsequently, each pot was covered with a wire net, and about 30 adults of green rice leafhoppers were liberated within the net. As the result, the death of more than 90 % of the leafhoppers could be observed on the next day.

Example 5

In a glass Petri dish of 14 cm in diameter were put 10 tobacco cutworm larvae (*Spodoptera litura*) at the third to fourth instar stage, and 1 ml of an aqueous 200 fold dilution of the emulsifiable concentrate obtained in Preparation 3 was sprayed to the larvae by use of a spraying tower. Subsequently, the larvae were transferred to another Petri dish with baits. As the result, the death of more than 90 % of the cutworm larvae could be observed after 2 days.

EXAMPLE 6

Pesticidal effects on housefly adults of the aerosol preparations obtained in Preparations 8, 9, 10, and 11 were tested according to the aerosol test method [described in "Soap and Chemical Specialties"; Bluebook (1965)] using Peet Grady's chamber (6 feet)$^3$. As the result, all the aerosol preparation could knock down more than 80 % of the flies within 15 minutes after spraying and could kill more than 70 % of the flies on the next day.

EXAMPLE 7

About 50 adults of Northern house mosquitoes were released in a glass chamber of (70 cm)$^3$, and a small electric fan of 13 cm in diameter equipped in the chamber was driven. Subsequently, 0.1 g of each of the mosquito coils obtained in Preparation 6 was ignited on both ends and put in the central part of the chamber bottom. As the result, more than 90 % of the mosquitoes could be knocked down within 20 minutes and the death of more than 80 % thereof could be observed on the next day.

EXAMPLE 8

About 50 adults of houseflies were released in a glass chamber of 70 cm)$^3$, and a small electric fan equipped in the chamber was driven. Subsequently, each of the heating fumigant compositions obtained in Preparation 7 was placed on an electrically heated plate and fumigated in the chamber. As the result, more than 90 % of the houseflies could be knocked down within 20 minutes.

EXAMPLE 9

Each of the dust preparations obtained in Preparation 5 was uniformly sprinkled on the bottom of a Petri dish of 14 cm in diameter in the proportion of 2 g/m$^2$, and then butter was coated on the inner wall of the dish, except the portion of about 1 cm from the bottom. Subsequently, a group of 10 adult German cockroaches was liberated in the dish and contacted with the dust preparation for 30 minutes, whereby more than 90 % of knocked down cockroaches could be killed during 3 days after the contact.

EXAMPLE 10

Into 10 liters of water in a 14 liter polyethylene-made pail was charged 1 g of each of the granule preparations obtained in Preparation 12. After one day, about 100 last-instar larvae of Northern house mosquitoes were liberated in said water, and the alive and dead of the larvae were observed with time. As the result, more than 90 % of the larvae could be killed within 24 hours.

EXAMPLE 11

3 Grams of each of the oil preparations obtained in Preparation 2 was fogged by means of an insect fogger (manufactured by Burgess Vibrocrafters, Inc., U.S.A.) into the same Peet Grady's chamber as in Example 5 into which about 500 houseflies had previously been liberated. As the result, more than 90 % of the houseflies could be knocked down within 30 minutes.

EXAMPLE 12

Chinese cabbages were grown in a green house, and were artificially parasitized with cutworms, cabbage worms and diamond-back moths. Thereafter, the green house (2 m in height) was divided into compartments of $(30 \text{ m})^2$ in area, and each compartment was fumigated, by use of a thermofumigator (SEARCH), with 10 g of each of the wettable powder preparations obtained in Preparation 4. As the result, no increasing damage of the cabbages was substantially observed.

EXAMPLE 13

Mottled kidney bean plants (at the stage of 2 leaves), which had elapsed 9 days after sowing in flower pots, were parasitized with 10 to 15 carmine mites (*Tetranychus telarius*) per leaf, and then allowed to stand for a week in a thermostat at 27°C, whereby the mites at various growth stages propagated in large numbers. At this stage, an aqueous 200 fold dilution of each of the emulsifiable concentrates obtained in Preparation 3 was sprayed to the plants in a proportion of 10 ml per pot, using a turn table. After 10 days, the plants were observed to find almost no damage.

In the accompanying drawings, FIG. 1 shows the relation between a mixing ratio and a relative efficacy of the mixture [compound (II) and compound (III)] on the mosquitoes and the houseflies; and FIG. 2 shows the relation between a mixing ratio and a relative efficacy of the mixture [compound (II) and compound (IV)] on the mosquitoes and the houseflies.

What we claim is:

1. An insecticidal composition containing an inert carrier and as active ingredients an insecticidally effective amount of the mixture consisting of (I) (±)2-allyl-3-methyl-cyclopent-2-ene-1-one-4-yl (+)transchrysanthemate or (II) (+)-2-allyl-3-methyl-cyclopent-2-ene-1-one-4-yl (+)trans-chrysanthemate and III N-(3,4,5,6-tetrahydrophthalimido)-methyl (±)cis, trans-chrysanthemate or (IV) N-(3,4,5,6-tetrahydrophthalimide)-methyl (+)trans-chrysanthemate wherein the ratio of compounds (I) or (II) to compounds (III) or (IV) is 1:1 to 1:4.

2. The insecticidal composition according to claim 1, wherein said composition contains 0.05 to 90 % by weight of the active ingredients.

3. The insecticidal composition according to claim 1, wherein the ratio of compounds (I) or (II) to compounds (III) or (IV) is 1:2 to 1:3.

4. The insecticidal composition according to claim 1 in the form of an oil spray or an aerosol spray.

5. The insecticidal composition according to claim 4, in the form of an aerosol spray.

6. A method for knocking down and killing insects, which comprises contacting the insects with an insecticidally effective amount of the composition of claim 1.

7. A method for knocking down and killing insects, which comprises contacting the insects with an insecticidally effective amount of the composition of claim 4.

* * * * *